(12) United States Patent
Cradic et al.

(10) Patent No.: US 6,771,578 B2
(45) Date of Patent: Aug. 3, 2004

(54) COLORED DATA STORAGE MEDIA

(75) Inventors: Curtis Cradic, Newburgh, IN (US);
Steven R. Peak, Evansville, IN (US);
Connie J. Bland, Mt. Vernon, IN (US);
Steven F. Hubbard, West Sand Lake, NY (US)

(73) Assignee: General Electric Company, Schenectady, NY (US)

(\*) Notice: Subject to any disclaimer, the term of this patent is extended or adjusted under 35 U.S.C. 154(b) by 0 days.

(21) Appl. No.: 10/249,071

(22) Filed: Mar. 13, 2003

(65) Prior Publication Data

US 2003/0152774 A1 Aug. 14, 2003

Related U.S. Application Data

(63) Continuation of application No. 09/766,303, filed on Jan. 19, 2001.
(60) Provisional application No. 60/236,434, filed on Sep. 29, 2000.

(51) Int. Cl.⁷ .................................................. H04N 5/76
(52) U.S. Cl. .................... 369/59.11; 369/47; 428/411.1; 528/196; 528/198
(58) Field of Search ................................ 369/47, 59.11; 428/411.1; 528/196, 198

(56) References Cited

U.S. PATENT DOCUMENTS

| | | |
|---|---|---|
| 2,139,155 A | 12/1938 | Gernandt |
| 3,152,098 A | 10/1964 | Snedeker |
| 3,423,483 A | 1/1969 | Anyos et al. |
| 3,507,951 A | 4/1970 | Morecroft et al. |
| 3,635,895 A | 1/1972 | Kramer |
| 3,673,146 A | 6/1972 | Factor |
| 3,689,768 A | 9/1972 | Sato et al. |
| 4,001,184 A | 1/1977 | Scott |
| 4,023,185 A | 5/1977 | Bloom et al. |
| 4,049,614 A | 9/1977 | Baron et al. |
| 4,092,288 A | 5/1978 | Calkins et al. |
| 4,097,895 A | 6/1978 | Spong |
| 4,101,907 A | 7/1978 | Bell et al. |
| 4,143,026 A | 3/1979 | Panek et al. |
| 4,190,843 A | 2/1980 | Spong |
| 4,217,438 A | 8/1980 | Brunelle et al. |
| 4,218,689 A | 8/1980 | Bloom et al. |
| 4,219,826 A | 8/1980 | Bloom et al. |
| 4,241,355 A | 12/1980 | Bloom et al. |
| 4,242,689 A | 12/1980 | Bloom et al. |
| 4,251,425 A | 2/1981 | Ohara et al. |
| 4,271,211 A | 6/1981 | Knepper |
| 4,284,411 A | 8/1981 | Neeff et al. |
| 4,286,957 A | 9/1981 | Le Naour-Sene |
| 4,315,269 A | 2/1982 | Bloom et al. |
| 4,332,587 A | 6/1982 | Kressner et al. |
| 4,336,545 A | 6/1982 | Howe et al. |
| 4,363,844 A | 12/1982 | Lewis et al. |
| 4,377,389 A | 3/1983 | Haddad et al. |
| 4,405,706 A | 9/1983 | Takahashi et al. |
| 4,444,714 A | 4/1984 | Martensen |
| 4,464,487 A | 8/1984 | Thomas et al. |
| 4,477,608 A | 10/1984 | Babler et al. |
| 4,501,876 A | 2/1985 | Zahr |
| 4,521,483 A | 6/1985 | Sasaki et al. |
| 4,542,957 A | 9/1985 | Ishiwari et al. |
| 4,640,690 A | 2/1987 | Baumgartner et al. |
| 4,650,823 A | 3/1987 | Krishnan et al. |
| 4,689,086 A | 8/1987 | Naumann et al. |
| 4,709,363 A | 11/1987 | Dirks et al. |
| 4,719,615 A | 1/1988 | Feyrer et al. |
| 4,722,595 A | 2/1988 | Siol |
| 4,732,570 A | 3/1988 | Baumgartner et al. |
| 4,746,711 A | 5/1988 | Serini et al. |
| 4,812,141 A | 3/1989 | Baumgartner et al. |
| 4,812,142 A | 3/1989 | Brodmann |
| 4,889,756 A | 12/1989 | Barzynski et al. |
| 4,891,800 A | 1/1990 | Sugaya |
| 4,919,514 A | 4/1990 | Ebert et al. |
| 4,948,715 A | 8/1990 | Hulme-Lowe et al. |

(List continued on next page.)

FOREIGN PATENT DOCUMENTS

| | | |
|---|---|---|
| EP | 0004268 | 6/1981 |
| EP | 0113870 A1 | 7/1984 |
| EP | 0101667 | 10/1984 |
| EP | 0212411 B1 | 3/1987 |
| EP | 0215322 B1 | 3/1987 |
| EP | 0311512 A1 | 4/1989 |
| EP | 0408271 A2 | 1/1991 |
| EP | 0178836 B1 | 4/1991 |
| EP | 0438225 B1 | 10/1996 |
| EP | 0980067 A2 | 2/2000 |

(List continued on next page.)

OTHER PUBLICATIONS

Play Station 2 "Surfing H3O" Disk.
Japan Food Research Laboratories, "Test Report", Mar. 13, 1996, 2 pages.
Japanese Patent No. JP62168119, Publication date: Jul. 24, 1987, Abstract Only (1 page).
Japanese Patent No. JP6341086, Publication date: Dec. 13, 1994, Abstract Only (1 page).
Japanese Patent No. JP6341099, Publication date: Dec. 13, 1994, Abstract Only (1 page).
Japanese Patent No. JP6341102, Publication date: May 4, 1994, Abstract Only (1 page).
Japanese Patent No. JP7111785, Publication date: Apr. 25, 1995, Abstract Only (1 page).
International Search Report, International Application No. PCT/US02/33503, International Filing Date: Oct. 16, 2002 (4 pages).

*Primary Examiner*—Terressa Boykin

(57) ABSTRACT

One method for producing a data storage media, comprises: molding a material comprising plastic and a fluorescent material to form a substrate, and disposing a data layer on the substrate. The substrate has a transmissivity of about 85% or less at a readback laser wavelength when traversing a 1.2 mm thick colored substrate, and the has a fluorescent color emission wavelength which is not equal to the readback laser wavelength.

23 Claims, No Drawings

U.S. PATENT DOCUMENTS

| | | | | |
|---|---|---|---|---|
| 4,983,648 | A | 1/1991 | Laughner et al. | |
| 4,998,239 | A | 3/1991 | Strandjord et al. | |
| 5,018,828 | A | 5/1991 | Ohdaira et al. | 350/96.34 |
| 5,051,977 | A | 9/1991 | Goldberg | 369/126 |
| 5,116,547 | A | 5/1992 | Tsukahara et al. | |
| 5,190,800 | A | 3/1993 | Yamada et al. | |
| 5,240,464 | A | 8/1993 | Kluger et al. | |
| 5,307,229 | A | 4/1994 | Sata | |
| 5,447,767 | A | 9/1995 | Tanabe et al. | 428/64.4 |
| 5,453,100 | A | 9/1995 | Sieloff | |
| 5,491,029 | A | 2/1996 | Evans et al. | |
| 5,534,602 | A | 7/1996 | Luminski et al. | 525/432 |
| 5,640,382 | A | 6/1997 | Forczak et al. | |
| 5,648,197 | A | 7/1997 | Kuroda | |
| 5,671,205 | A | 9/1997 | Ledieu | |
| 5,688,447 | A | 11/1997 | Hong | |
| 5,800,573 | A | 9/1998 | Michaelis et al. | |
| 5,804,124 | A | 9/1998 | Sata | |
| 5,820,961 | A | 10/1998 | Maruyama et al. | |
| 5,840,395 | A | 11/1998 | Sawada et al. | |
| 5,894,069 | A | 4/1999 | Wen et al. | |
| 5,958,087 | A | 9/1999 | Liao et al. | |
| 6,007,889 | A | 12/1999 | Nee | 428/64.1 |
| 6,022,944 | A | 2/2000 | Weaver et al. | |
| 6,045,888 | A | 4/2000 | Chan et al. | |
| 6,099,930 | A | 8/2000 | Cyr et al. | |
| 6,117,168 | A | 9/2000 | Yang et al. | 623/1.44 |
| RE36,902 | E | 10/2000 | Eckel et al. | |
| 6,183,830 | B1 | 2/2001 | Okamoto et al. | 428/64.7 |
| 6,214,433 | B1 | 4/2001 | Tronche et al. | |
| 6,219,329 | B1 | 4/2001 | Tanaka et al. | 369/275.1 |
| 6,226,109 | B1 | 5/2001 | Tompkin et al. | |
| 6,245,118 | B1 | 6/2001 | Shakhnovich | |
| 6,280,808 | B1 | 8/2001 | Fields et al. | |
| 6,475,588 | B1 | 11/2002 | Schottland et al. | 428/64.1 |
| 6,475,589 | B1 | 11/2002 | Pai-Paranjape et al. | 428/64.1 |
| 6,673,410 | B2 | 1/2004 | Pai-Paranjape et al. | |

FOREIGN PATENT DOCUMENTS

| | | | |
|---|---|---|---|
| EP | 1069556 | A1 | 1/2001 |
| EP | 1236758 | A1 | 9/2002 |
| GB | 963779 | | 7/1964 |
| GB | 1195078 | | 6/1970 |
| GB | 1502237 | | 2/1978 |
| GB | 2005457 | A | 4/1979 |
| GB | 1577548 | | 10/1980 |
| GB | 1595426 | | 8/1981 |
| JP | 53-070730 | | 6/1978 |
| JP | 55123646 | | 9/1980 |
| JP | 55160051 | | 12/1980 |
| JP | 56031085 | | 3/1981 |
| JP | 56070053 | | 6/1981 |
| JP | 56070054 | | 6/1981 |
| JP | 57150152 | | 9/1982 |
| JP | 57151644 | | 9/1982 |
| JP | 57192458 | | 11/1982 |
| JP | 558174438 | | 10/1983 |
| JP | 58218055 | | 12/1983 |
| JP | 59045195 | | 3/1984 |
| JP | 59228712 | | 12/1984 |
| JP | 60194720 | | 12/1985 |
| JP | 6145437 | | 5/1986 |
| JP | 61-129753 | | 6/1986 |
| JP | 61-236891 | | 10/1986 |
| JP | 62168119 | | 7/1987 |
| JP | 62-220559 | | 9/1987 |
| JP | 63195838 | | 12/1988 |
| JP | 02033742 | | 2/1990 |
| JP | 06060422 | | 4/1994 |
| JP | 06-145437 | | 5/1994 |
| JP | 07057300 | | 3/1995 |
| JP | 7057300 | | 3/1995 |
| JP | 7262606 | | 10/1995 |
| JP | 8-279188 | | 10/1996 |
| JP | 8279188 | | 10/1996 |
| JP | 9288847 | | 11/1997 |
| JP | 9180261 | | 10/1998 |
| JP | 11025518 | | 1/1999 |
| WO | WO 80/00708 | | 4/1980 |
| WO | WO 84/02794 | | 7/1984 |
| WO | WO 84/02795 | | 7/1984 |
| WO | WO 99/18571 | | 4/1999 |
| WO | WO 99/24527 | | 5/1999 |
| WO | WO 01/83595 | A1 | 11/2001 |
| WO | WO 03/013214 | A2 | 2/2003 |

# COLORED DATA STORAGE MEDIA

CROSS REFERENCE TO RELATED APPLICATIONS

This application is a continuation of U.S. application Ser. No. 09/766,303, filed on Jan. 19, 2001, which claims the benefit of the filing date of U.S. Provisional Application Serial No. 60/236,434 filed on Sep. 29, 2000, which is hereby incorporated by reference.

BACKGROUND OF INVENTION

Optical, magnetic and magneto-optic media are primary sources of high performance storage technology which enables high storage capacity coupled with a reasonable price per megabyte of storage. Use of optical media has become widespread in audio, video, and computer data applications in such formats as compact disk (CD), digital versatile disk (DVD) including multi-layer structures like DVD-5, DVD-9, and multi-sided formats such as DVD-10, and DVD-18, magneto-optical optical disk (MO), and other write-once and rewritable formats such as CD-R, CD-RW, DVD-R, DVD-RW, DVD+RW, DVD-RAM. In these and other formats, data are encoded onto a substrate into a digital data series. In pre-recorded media, such as CD, the data are typically pits and grooves formed on the surface of a plastic substrate through a method such as injection molding, stamping or the like.

In recordable and rewritable media, the data are encoded by laser, which illuminates an active data layer that undergoes a phase change, thus producing a series of highly-reflecting or non-reflective regions making up the data stream. In these formats, a laser beam first travels through a plastic substrate before reaching the data layer. At the data layer, the beam is either reflected or not, in accordance with the endcoded data. The laser light then travels back through the plastic and into an optical detector system where the data are interpreted.

It is well known in the art that, due to the sensitivity of the optical readout system, the amount of absorption of the light by the media should be minimized. Consequently, the plastic in the optical media is a colorless, transparent material having good birefringence properties, such as polycarbonate. Although media formats have been introduced which read data from the top-side of a substrate, the vast majority of playback systems are only compatible with media requiring the laser to travel through the substrate twice. Hence, the transparency to the laser is a requirement and colorless materials are typically used to maximize transparency at the laser wavelength.

The widespread use of colorless, transparent materials makes product differentiation difficult, except by costly printing methods on the top surface of the optical media. Furthermore, in the cases where printed decorations cover one entire surface of a disk, the covered surface is unusable for data storage.

What is needed in the art are colored plastic compositions for use as optical media.

TECHNICAL FIELD

The present disclosure relates to data storage media, and especially relates to fluorescent, plastic data storage media.

SUMMARY OF INVENTION

The colored data storage media overcomes the above described drawbacks and deficiencies. One method for producing a data storage media, comprises: molding a material comprising plastic and a fluorescent material to form a substrate, and disposing a data layer on the substrate. The substrate has a transmissivity of about 85% or less at a readback laser wavelength when traversing a 1.2 mm thick colored substrate, and the has a fluorescent color emission wavelength which is not equal to the readback laser wavelength.

Another method for producing a data storage media comprises: molding a material comprising plastic and colorant to form a substrate, wherein the substrate has a transmissivity of about 70% to about 85% at a readback laser wavelength when traversing a 1.2 mm thick colored substrate, and disposing a data layer on the substrate.

Yet another method for producing the data storage media, comprises: molding a material comprising plastic, and a fluorescent material to form a substrate, wherein the substrate has a transmissivity of about 85% or less at a readback laser wavelength when traversing a 1.2 mm thick colored substrate, and wherein the substrate has a fluorescent color emission wavelength which is not equal to the readback laser wavelength and has a transmissivity of about 70% to about 90% at the laser readback wavelength, and disposing a data layer on the substrate.

Another method for producing data storage media, comprises: molding a material comprising plastic, colorant, and visual effects to form a substrate, and disposing a data layer on the substrate. The substrate has a transmissivity of about 85% or less at a readback laser wavelength when traversing a 1.2 mm thick colored substrate, and the visual effects are selected from the group consisting of glass, metal, titanium dioxide, mica, angular metamerism materials, and combinations comprising at least one of the foregoing visual effects.

DETAILED DESCRIPTION

The present invention relates to data storage media, namely, colored optical data storage media and methods for making the same. In one embodiment, the colored media has, at the readback laser wavelength, a transmissivity of light of about 85% or less, with about 70% to about 85% preferred, about 75% to about 80% also preferred, and about 75% to about 85% especially preferred, when traversing a 1.2 mm thick colored substrate (disk). Alternatively, if fluorescent, the media preferably emits light at a wavelength which does not inhibit data retrieval. The fluorescent media can comprise a substrate which has a transmissivity, at the readback laser wavelength, of about 85% or less, preferably exceeding 68%, with about 70% to about 95% preferred, about 70% to about 90% more preferred, and about 70% to about 85% especially preferred, when traversing a 1.2 mm thick substrate (disk).

Typically, these storage media can comprise a substrate comprising a plastic and a colorant which does not inhibit data retrieval. Generally, up to about 10 weight percent (wt %) colorant can be used, with up to about 0.5 wt % preferred, up to about 1 wt % colorant more preferred, and less than about 0.5 wt % or so colorant especially preferred, based upon the total weight of the substrate.

In theory, any plastic that exhibits appropriate properties and can be employed. However, the plastic should be capable of withstanding the subsequent processing parameters (e.g., application of subsequent layers) such as sputtering (i.e., temperatures up to and exceeding about 200° C. (typically up to or exceeding about 300° C.) for magnetic media, and temperatures of about room temperature (about 25° C.) up to about 150° C. for magneto-optic media). That is, it is desirable for the plastic to have sufficient thermal stability to prevent deformation during the deposition steps. For magnetic media, appropriate plastics include thermoplastics with glass transition temperatures greater than about 150° C., with greater than about 200° C. preferred (e.g., polyetherimides, polyetheretherketones, polysulfones, polyethersulfones, polyetherethersulfones, polyphenylene ethers, polyimides, high heat polycarbonates, etc.): with materials having glass transition temperatures greater than about 250° C. more preferred, such as polyetherimide in which sulfonedianiline or oxydianiline has been substituted for m-phenylenediamine, among others, as well as polyimides, such as Probimide (or the dry powder equivalent, Matrimid 5218, from Ciba Geigy Chemical); combinations comprising at least one of the foregoing plastics, and others.

Additionally, it is possible for thermosets to be used in the application provided the thermoset possess sufficient flow under the stamping conditions to permit formation of the desired surface features. As various applications may require polymers with different glass transition temperatures, it may be advantageous to be able to adjust the glass transition temperature of a plastic (homopolymer, copolymer, or blend) to achieve a film with the desired glass transition temperature. To this end, polymer blends, such as those described in U.S. Pat. No. 5,534,602 (to Lupinski and Cole, 1996), may be employed in the preparation of the coating solution. In this example, polymer blends provide, selectively, variable glass transition temperatures of about 190° C. to about 320° C.

Some possible examples of plastics include, but are not limited to, amorphous, crystalline and semi-crystalline thermoplastic materials: polyvinyl chloride, polyolefins (including, but not limited to, linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including, but not limited to, hydrogenated polysulfones, and the like), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, polymethylmethacrylate, methyl methacrylate-polyimide copolymers, and the like), polyacrylonitrile, polyacetals, polycarbonates, polyphenylene ethers (including, but not limited to, those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, Teflons, as well as thermosetting resins such as epoxy, phenolic, alkyds, polyester, polyimide, polyurethane, mineral filled silicone, bis-maleimides, cyanate esters, vinyl, and benzocyclobutene resins, in addition to blends, copolymers, mixtures, reaction products and composites comprising at least one of the foregoing plastics.

As used herein, the terms "polycarbonate", "polycarbonate composition", and "composition comprising aromatic carbonate chain units" includes compositions having structural units of the formula (1):

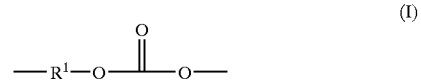

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexylmethylene, 2-[2,2,1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Polycarbonates can be produced by the interfacial reaction of dihydroxy compounds in which only one atom separates $A^1$ and $A^2$. As used herein, the term "dihydroxy compound" includes, for example, bisphenol compounds having general formula (III) as follows:

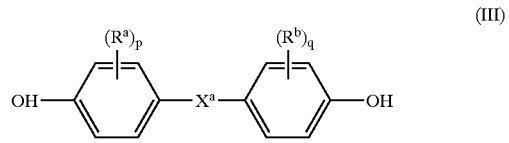

wherein $R^a$ and $R^b$ each represent a halogen atom or a monovalent hydrocarbon group and may be the same or different; p and q are each independently integers from 0 to 4; and $X^a$ represents one of the groups of formula (IV):

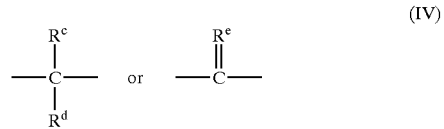

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include dihydric phenols and the dihydroxy-substituted aromatic hydrocarbons disclosed by name or formula (generic or specific) in U.S. Pat. No. 4,217,438, which is incorporated herein by reference. A nonexclusive list of specific examples of the types of bisphenol compounds that may be represented by formula (III) includes the following: 1,1-bis(4-hydroxyphenyl) methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy -1-methylphenyl) propane; 1,1- bis(4-hydroxy-t-butylphenyl) propane; bis (hydroxyaryl) alkanes such as 2,2-bis(4-hydroxy-3-bromophenyl) propane; 1,1-bis (4-hydroxyphenyl) cyclopentane; and bis (hydroxyaryl) cycloalkanes such as 1,1-bis(4-hydroxyphenyl) cyclohexane; and the like as well as combinations comprising at least one of the foregoing.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have from 2 to about 40 carbons. A preferred aliphatic diacid is dodecandioic acid. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents are well known and may comprise polyfunctional organic compounds containing at least three functional groups which may be hydroxyl, carboxyl, carboxylic anhydride, haloformyl and mixtures comprising at least one of the foregoing. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p -hydroxyphenyl)-ethyl) alpha, alpha-dimethyl benzyl)phenol), 4-chloroformyl phthalic anhydride, trimesic acid and benzophenone tetracarboxylic acid, and the like. The branching agents may be added at a level of about 0.05 to about 2.0 weight percent. Branching agents and procedures for making branched polycarbonates are described in U.S. Pat. Nos. 3,635,895 and 4,001,184 which are incorporated by reference. All types of polycarbonate end groups are herein contemplated.

Preferred polycarbonates are based on bisphenol A, in which each of $A^1$ and $A^2$ is p-phenylene and $Y^1$ is isopropylidene. Preferably, the weight average molecular weight of the polycarbonate is about 5,000 to about 100,000, more preferably about 10,000 to about 65,000, and most preferably about 15,000 to about 35,000.

In monitoring and evaluating polycarbonate synthesis, it is of particular interest to determine the concentration of Fries product present in the polycarbonate. As noted, the generation of significant Fries product can lead to polymer branching, resulting in uncontrollable melt behavior. As used herein, the terms "Fries" and "Fries product" denote a repeating unit in polycarbonate having the formula (IV):

(V)

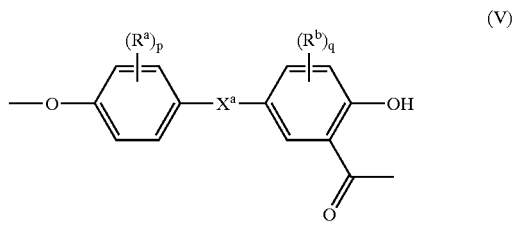

wherein $X^a$ is a bivalent radical as described in connection with Formula (III) supra.

The polycarbonate composition may also include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; blowing agents; and the like, as well as combinations comprising at least one of the foregoing additives. Examples of fillers or reinforcing agents include glass fibers, asbestos, carbon fibers, silica, talc and calcium carbonate. Examples of heat stabilizers include triphenyl phosphite, tris-(2,6-dimethylphenyl)phosphite, tris-(mixed mono-and di-nonylphenyl)phosphite, dimethylbenene phosphonate and trimethyl phosphate. Examples of antioxidants include octadecyl-3-(3,5-di-tert-butyl-4-hydroxyphenyl) propionate, and pentaerythrityl-tetrakis[3-(3,5-di-tert-butyl-4-hydroxyphenyl) propionate]. Examples of light stabilizers include 2-(2-hydroxy-5-methylphenyl) benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of the antistatic agent include glycerol monostearate, sodium stearyl sulfonate, and sodium dodecylbenzenesulfonate. Examples of mold releasing agents include stearyl stearate, beeswax, montan wax and paraffin wax. Examples of other resins include but are not limited to polypropylene, polystyrene, polymethyl methacrylate, and polyphenylene oxide. Combinations of any of the foregoing additives may be used. Such additives may be mixed at a suitable time during the mixing of the components for forming the composition.

The color is imparted to the substrate with a colorant (e.g., dye, pigment, or the like). The amount and type of colorant is chosen to avoid producing a substrate having contaminants (i.e., by-products) which produce data readout errors, and to attain the desired color, while controlling transmissivity, at the readback laser wavelength, to greater than about 68%, when traversing a 1.2 mm thick colored substrate (disk). Contrary to conventional belief, the substrate may be fluorescent, that is, emit light at a particular wavelength. In this embodiment, the colorant is a fluorescent material which has a fluorescent color emission wavelength which is not equal to the readback laser wavelength, and preferably different by at least about 10 nanometers (nm) (i.e., higher or lower) than the readback laser wavelength, with a difference of about 15 nm or greater preferred, and about 20 nm or greater especially preferred. Here it is further preferred that the substrate have a transmissivity at the readback laser frequency, of greater than about 70% when traversing a 1.2 mm thick colored substrate (disk).

Some possible fluorescent colorants include:

| DESCRIPTION | COMPOSITION |
| --- | --- |
| C.I. Pigment Red 181 | benzothiophenone ($C_{18}H_{10}Cl_2O_2S_2$) |
| C.I. Solvent Orange 63 | 14H-anthra{2.1.9-MNA}thioxanthen-14-one |
| C.I. Disperse Red 364 | 2(3oxobenzothien2(3H)yliden) benzothiophenone |
| C.I. Solvent Blue 97 | anthraquinone 1,4-bis(2,6-diethyl-4-methlphenl) aminoanthracendione |
| C.I. Solvent Green 5 | 3,9-perylendicarboxlic acid,bis-2-methylpropryl ester |
| C.I. Solvent Yellow 98 | 2-octadecylthioxanthenoiso quinolinfionr | as well as other fluorescent colorants, and combinations comprising at least one of the foregoing colorants.

Further color or design may be imparted to the substrate via a decorative layer which does not comprise an absorption percentage limitation. The decorative layer, which is disposed on a side of the disk opposite a data storage layer or in between data storage layers which are read from opposite sides of the disk, can be any color or design, such as a design which optionally includes sparkle, i.e., visual effects which scatter the incident light (such as glass or metal (in the form of flakes, chips, particles, powder, and the like, as well as combinations comprising at least one of the foregoing forms, with flakes preferred), titanium dioxide ($TiO_2$) mica, fiberglass, angular metamerism materials such as, ChromaFlair Gold/Silver 080, ChromaFlair Cyan/Purple 230 (commercially available from Flex Products, Santa Rosa, Calif.), among other materials, as well as combinations comprising at least one of the foregoing visual effects.

In addition to the plastic and colorant, the composition may optionally include various additives ordinarily incorporated in resin compositions of this type. Such additives may include antioxidants, heat stabilizers, anti-static agents (tetra alkylammonium benzene sulfonate salts, tetra alkylphosphonium benzene sulfonate salts, and the like), mold releasing agents (pentaerythritol tetrastearate; glycerol monstearate, and the like), and the like, and combinations comprising at least one of the foregoing. For example, the substrate can comprise about 0.01 to about 0.1 wt % of a heat stabilizer; about 0.01 to about 0.2 wt % of an antistatic agent; and about 0.1 to about 1 wt % of a mold releasing agent; based upon the total weight of the substrate.

Some possible antioxidants include, for example, organophosphites, e.g., tris (nonyl-phenyl)phosphite, tris(2,4-di-t-butylphenyl)phosphite, bis(2,4-di-t -butylphenyl) pentaerythritol diphosphite, distearyl pentaerythritol diphosphite and the like; alkylated monophenols, polyphenols and alkylated reaction products of polyphenols with dienes, such as, for example, tetrakis[methylene(3,5-di-tert-butyl -4-hydroxyhydrocinnamate)]methane, 3,5-di-tert-butyl-4-hydroxyhydrocinnamate octadecyl, 2,4-di-tert-butylphenyl phosphite, and the like; butylated reaction products of para-cresol and dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl) -propionic acid with monohydric or polyhydric alcohols; esters of thioalkyl or thioaryl compounds, such as, for example, distearylthiopropionate, dilaurylthiopropionate, ditridecylthiodipropionate, and the like; amides of beta-(3,5-di-tert-butyl-4-hydroxyphenyl)-propionic acid; and the like, as well as combinations comprising at least one of the foregoing.

Other potential additives which may be employed comprise: UV absorbers; stabilizers such as light and thermal stabilizers (e.g., acidic phosphorous-based compounds); hindered phenols; zinc oxide and/or zinc sulfide particles; lubricants (mineral oil, and the like), plasticizers, dyes (quinines, azobenzenes, and the like); among others, as well as combinations comprising at least one of the foregoing additives.

In order to aide in the processing of the plastic, particularly polycarbonate, catalyst(s) may also be employed, namely in the extruder or other mixing device. The catalyst typically assists in controlling the viscosity of the resulting material. Possible catalysts include tetraalkylammonium hydroxide, tetraalkylphosphonium hydroxide and the like, with diethyldimethylammonium hydroxide and tetrabutylphosphonium hydroxide preferred. The catalyst(s) can be employed alone or in combination with quenchers such as acids, such as phosphoric acid, and the like. Additionally, water may be injected into the polymer melt during compounding and removed as water vapor through a vent to remove residual volatile compounds.

Data storage media can be produced by first forming the plastic using a conventional reaction vessel capable of adequately mixing various precursors, such as a single or twin screw extruder, kneader, blender, or the like. The precursors can either be premixed with the colorant (e.g., in a pellet, powder, and/or liquid form) and simultaneously fed through a hopper into the extruder, or the colorant can be optionally added in the feed throat or through an alternate injection port of the injection molding machine or other molding.

The extruder should be maintained at a sufficiently high temperature to melt the plastic precursors without causing decomposition thereof. For polycarbonate, for example, temperatures of about 220° C. to about 360° C. can be used, with about 260° C. to about 320° C. preferred. Similarly, the residence time in the extruder should be controlled to minimize decomposition. Residence times of up to about 2 minutes (min) or more can be employed, with up to about 1.5 min preferred, and up to about 1 min especially preferred. Prior to extrusion into the desired form (typically pellets, sheet, web, or the like, the mixture can optionally be filtered, such as by melt filtering and/or the use of a screen pack, or the like, to remove undesirable contaminants or decomposition products.

Once the plastic composition has been produced, it can be formed into the data storage media using various molding and/or processing techniques. Possible molding techniques include injection molding, film casting, extrusion, press molding, blow molding, stamping, and the like. Once the substrate has been produced, additional processing, such as electroplating, coating techniques (spin coating, spray coating, vapor deposition, screen printing, painting, dipping, and the like), lamination, sputtering, and combinations comprising at least one of the foregoing processing techniques, among others conventionally known in the art, may be employed to dispose desired layers on the colored substrate.

An example of a polycarbonate data storage media comprises an injection molded colored polycarbonate substrate which may optionally comprise a hollow (bubbles, cavity, and the like) or filled (metal, plastics, glass, ceramic, and the like, in various forms such as fibers, spheres, particles, and the like) core. Disposed on the substrate are various layers including: a data layer, dielectric layer(s), a reflective layer (s), and/or a protective layer, as well as combinations comprising at least one of the foregoing layers. These layers comprise conventional materials and are disposed in accordance with the type of media produced. For example, for a first surface media, the layers may be protective layer, dielectric layer, data storage layer, dielectric layer, and then the reflective layer disposed in contact with the substrate, with an optional decorative layer disposed on the opposite side of the substrate. Meanwhile, for an optical media, the layers may be optional decorative layer, protective layer, reflective layer, dielectric layer, and data storage layer, with a subsequent dielectric layer in contact with the substrate. It is understood that the form of the media is not limited to disk-shape, but may be any shape which can be accommodated in a readout device.

The data storage layer(s) may comprise any material capable of storing retrievable data, such as an optical layer, magnetic layer, or a magneto-optic layer. Typically the data layer has a thickness of up to about 600 Angstroms (Å) or so, with a thickness up to about 300 Å preferred. Possible data storage layers include, but are not limited to, oxides (such as silicone oxide), rare earth element—transition metal alloy, nickel, cobalt, chromium, tantalum, platinum, terbium, gadolinium, iron, boron, others, and alloys and combinations comprising at least one of the foregoing, organic dye (e.g., cyanine or phthalocyanine type dyes), and inorganic phase change compounds (e.g., TeSeSn, InAgSb, and the like).

The protective layer(s), which protect against dust, oils, and other contaminants, can have a thickness of greater than about 100 microns ($\mu$) to less than about 10 Å, with a thickness of about 300 Å or less preferred in some embodiments, and a thickness of about 100 Å or less especially preferred. The thickness of the protective layer(s) is usually determined, at least in part, by the type of read/write mechanism employed, e.g., magnetic, optic, or magneto-optic. Possible protective layers include anti-corrosive materials such as gold, silver, nitrides (e.g., silicon nitrides and aluminum nitrides, among others), carbides (e.g., silicon carbide and others), oxides (e.g., silicon dioxide and others), polymeric materials (e.g., polyacrylates or polycarbonates), carbon film (diamond, diamond-like carbon, and the like), among others, and combinations comprising at least one of the foregoing.

The dielectric layer(s), which are disposed on one or both sides of the data storage layer and are often employed as heat controllers, can typically have a thickness of up to or exceeding about 1,000 Å and as low as about 200 Å or less. Possible dielectric layers include nitrides (e.g., silicon nitride, aluminum nitride, and others); oxides (e.g., aluminum oxide); carbides (e.g., silicon carbide); and combinations comprising at least one of the foregoing materials, among other materials compatible within the environment and preferably not reactive with the surrounding layers.

The reflective layer(s) should have a sufficient thickness to reflect a sufficient amount of energy (e.g., light) to enable data retrieval. Typically the reflective layer(s) can have a thickness of up to about 700 Å or so, with a thickness of about 300 Å to about 600 Å generally preferred. Possible reflective layers include any material capable of reflecting the particular energy field, including metals (e.g., aluminum, silver, gold, titanium, and alloys and mixtures comprising at least one of the foregoing metals, and others).

In addition to the data storage layer(s), dielectric layer(s), protective layer(s) and reflective layer(s), other layers can be employed such as lubrication layer and others. Useful lubricants include fluoro compounds, especially fluoro oils and greases, and the like.

The following examples are provided to further illustrate the present invention and not to limit the scope hereof.

EXAMPLES

Colored pellets were prepared by mixing low viscosity polycarbonate resin powder (melt flow at 250° C. of 11 grams per 10 minutes (ASTM-D1238); molecular weight of about 17,700 grams per mole (g/mol) measured on GPC) with colorants specified in the Table. Formulations also included mold release agent (0.02 wt % glycerol monostearate) and Doverphos (S-9228); Bis(2,4-dicumylphenyl)pentaerythritol diphosphate antioxidant at 0.02 wt %). The blends were melted in a 30 millimeter (mm) twin-screw extruder, passed through a die, cooled, and pelletized.

Resulting pellets were injection molded into 1.2 mm thick compact disk substrates using a Krauss Maffei 80/190° C. Marathon Series, CD Liner, w/Non-Open Mold. Processing conditions as follows: Barrel Zone Temperature of about 250 to about 330° C.; Mold Temperatures set to 45° C.; Injection Speed Profile of about 20 millimeters per second (mm/s) to about 65 mm/s, 4 stages; Holding Pressure profile of about 150 bar to about 550 bar, 5 stages; Holding Pressure Time of about 0.05 to about 0.25 seconds, 5 stages; Cooling Time set for 2.5 seconds; Clamp Tonnage set for 400 kN; Injection pressure set at 1795 bar; Injection Position Profile of about 17.0 mm to about 4.5 mm, 4 stages. The resulting disks were tested for Block Error Rate on a CD Associates SL100 optical tester. Block Error Rate (BLER) is a measure of the number of blocks of data that have at least one occurrence of erroneous data. BLER is the combination of E11+E21+E31+E12+E22+E32 errors. A Block Error Rate below about 220 pulses is typically required in industry, with below 100 preferred, and below 50 especially preferred.

Pellets were also injection molded into 1.2 mm thick colored substrate (disk) and placed in spectrophotometer to determine the absorbance at 780 nanometers (nm), (i.e., the wavelength of the optical disk tester. If the disc is not readable by the tester an error message is given such as: "Unable to Retrieve VTOC (1FB)". Which means that the tester could not establish the "Volume Table of Contents", this information shows the layout of the program material on the disc.

TABLE

[t2]

| Color | Colorant | Loading (wt %) | % TRM at 780 nm | Elect. Test | BLER |
|---|---|---|---|---|---|
| Clear | — | — | 95.0 | Pass | 6.2 |
| lt. Orange fluorescent | R672: CI Solvent Orange 63 | 0.005 | 94.8 | 15.4 | |
| dk. Orange fluorescent | R65: C.I. Pigment Red 181 | 0.005 | 94.7 | Pass | 9.5 |
| Magenta flourescent | R663: Kenawax Fluorescent Red 3BYP | 0.050 | 94.7 | pass | 38.5 |
| Brightened lt. Blue | R73: C.I. Solvent Blue 97 R513: 2.5bis(5'-tert-butyl-2-benzoxazolyl)thiophene | 0.0003 0.008 | 94.4 | Pass | 25.6 |
| green/yellow fluorescent | R887: C.I. Solvent Green | 0.100 | 94.6 | Pass | 13.7 |
| Brightened lt. Green | R882: C.I. Solvent Yellow 98R73: C.I. Solvent Blue 97 | 0.00007 0.0004 | 94.7 | Pass | 31.2 |
| green purple | AM190: ChromaFlair Green/Purple 190 | 0.110 | 67.9 | fail | |
| gold silver | AM080: ChromaFlair Gold/Silver 080 | 0.060 | 65.8 | fail | |
| cyan purple | AM230: ChromaFlair Cyan/Purple 230 | 0.100 | 65.3 | fail | |
| Sandorin blue | R7260: Pigment Blue 60 | 0.010 | 71.1 | pass | 64.1 |
| Pink with glass flake | R666: C.I. Solvent Red 207 R203: Carbon Black Monarch 800 R71: C.I. Solvent Violet 13 R0979: Engelhard Mearl Pigment EP 97079 | 0.009 0.000022 0.00022 0.200 | 91.4 | fail | |
| Green with glass flake | R203: Carbon Black Monarch 800 R883: C.I. Pigment Yellow 138 | 0.0000133 0.00712 | | | |

TABLE-continued

[t2]

| Color | Colorant | Loading (wt %) | % TRM at 780 nm | Elect. Test | BLER |
|---|---|---|---|---|---|
| | R36: Solvent Green 28 | 0.00329 | | | |
| | R0979: Engelhard Mearl Pigment EP 97079 | 0.200 | | | |

TRM = amount of light transmitted through the substrate
BLER = pulses
fail = Unable to retrieve Volume Table of Contents (VTOC)
pass = booted
Electrical Test = did it play CD optical tester.
C.I. = Color Index
R0979 - commercially available from Engelhard, Peekskill, NY
R672 - commercially available from Clariant, Charlotte, NC
R65 - commercially available from Clariant, Charlotte, NC
R663 - commercially available from Clariant, Charlotte, NC
R73 - commercially available from Bayer, Pittsburgh, PA
R513 - commercially available from Ciba, Tarrytown, NY
R887 - commercially available from Bayer, Pittsburgh, PAR882 - commercially available from Clariant, Charlotte, NC
R7260 - commercially available from BASF, Mt. Olive, NJ
R666 - commercially available from Rose Color, New Ark, NJ
R203 - commercially available from Cabot, Alpharetta, GA
R71 - commercially available from Bayer, Pittsburgh, PA
R883 - commercially available from BASF, Mt. Olive, NJ
R36 - commercially available from Bayer, Pittsburgh, PA
AM190 - commercially available from Flex Products, Santa Rosa, CA
AM080 - commercially available from Flex Products, Santa Rosa, CA
AM230 commercially available from Flex Products, Santa Rosa, CA An alternative technique for product differentiation, colored disks, however, have not been used for optical media substrates due to absorption of the laser light, which interferes with data readout. Furthermore, the use of optical effects, such as fluorescence, in optical media substrates has not been done because fluorescence, in which light of a given color is absorbed and re-emitted at a different color, has not been tried because fluorescent emissions may interfere with the laser readout system. Other visual effects that may scatter an incident laser beam have similarly not been explored because, until recently, optical media consisted of 1-layer substrates, such as those in CD. Recently, the advent of DVD includes a second substrate layer which may be used for decorative purposes except in cases of multi-sided media. The use of inorganic fillers such as glass flake to produce visual effects may also alter Theological properties of a thermoplastic resin making it difficult to produce optical media substrates from such compositions.

Use of color or other visual effects in optical media substrates provides a way to differentiate brands of optical media. This differentiation can be used for increased appeal in the market, brand recognition, and can help avoid problems with unwanted duplication of data. Colored substrates can also provide an advantage of wavelength selectivity that cannot be obtained with colorless materials.

Data storage media substrates comprising visual effects have not previously been produced due to the significant adverse effect on rheology imparted by the visual effects. Previously, decorative labels would be glued to a surface of the substrate. In contrast, the substrates described herein can comprise the visual effects as part of the substrate, i.e., a molded layer disposed on one side of the substrate. Alternatively, the visual effects can be disposed between two substrates with reflective and data layers disposed between the visual effects and the substrate, optionally, adhesives can be used for bonding. These visual effects could be employed for numerous purposes including product differentiation, decoration, anti-piracy, and the like.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for producing a data storage media, comprising:
    molding a material comprising plastic and colorant to form a substrate, wherein the substrate has a transmissivity of about 70% to about 85% at a readback laser wavelength when traversing a 1.2 mm thick colored substrate;
    disposing a data layer on the substrate.

2. The method of claim 1, further comprising disposing a reflective layer on a side of the data layer opposite the substrate.

3. The method of claim 2, further comprising disposing a dielectric layer between the data layer and the reflective layer.

4. The method of claim 1, further comprising forming the material by mixing polycarbonate with the colorant, and wherein the molding further comprises injection molding.

5. The method of claim 1, further comprising disposing a protective layer on a side of the data layer opposite the substrate, wherein the protective layer comprises polycarbonate.

6. The method of claim 5, wherein the plastic comprises polyetherimide.

7. The method of claim 1, wherein the transmissivity is about 75% to about 80%.

8. The method of claim 1, wherein the transmissivity is about 75% to about 85%.

9. A method for producing data storage media, comprising:
    molding a material comprising plastic, colorant, and visual effects to form a substrate, wherein the substrate has a transmissivity of about 85% or less at a readback laser wavelength when traversing a 1.2 mm thick colored substrate, and wherein the visual effects are selected from the group consisting of glass, metal, titanium dioxide, mica, angular metamerism materials, and combinations comprising at least one of the foregoing visual effects; and
    disposing a data layer on the substrate.

10. The method of claim 9, wherein the visual effects have a geometry selected from the group consisting of chips, particles, and combinations comprising at least one of the foregoing geometries.

11. The method of claim 9, wherein the visual effects are in the form of flakes.

12. The method of claim 9, further comprising disposing a reflective layer on a side of the data layer opposite the substrate.

13. The method of claim 12, further comprising disposing a dielectric layer between the data layer and the reflective layer.

14. The method of claim 9, further comprising disposing a protective layer on a side of the data layer opposite the substrate, wherein the protective layer comprises polycarbonate.

15. The method of claim 14, wherein the plastic comprises polyetherimide.

16. A method for producing a data storage media, comprising:

molding a material comprising plastic and a fluorescent material to form a substrate, wherein the substrate has a transmissivity of about 85% or less at a readback laser wavelength when traversing a 1.2 mm thick colored substrate, and wherein the has a fluorescent color emission wavelength which is not equal to the readback laser wavelength; and disposing a data layer on the substrate.

17. The method of claim 16, wherein the fluorescent color emission wavelength is different than the readback laser wavelength by at least about ±10 nm.

18. The method of claim 16, wherein the fluorescent color emission wavelength is different than the readback laser wavelength by at least about ±20 nm.

19. The method of claim 16, further comprising disposing a reflective layer on a side of the data layer opposite the substrate.

20. The method of claim 19, further comprising disposing a dielectric layer between the data layer and the reflective layer.

21. The method of claim 16, further comprising disposing a protective layer on a side of the data layer opposite the substrate, wherein the protective layer comprises polycarbonate.

22. The method of claim 21, wherein the plastic comprises polyetherimide.

23. A method for producing a data storage media, comprising:

molding a material comprising plastic, and a fluorescent material to form a substrate has a transmissivity of about 85% or less at a readback laser wavelength when traversing a 1.2 mm thick colored substrate, and wherein the substrate has a fluorescent color emission wavelength which is not equal to the readback laser wavelength and has a transmissivity of about 70% to about 90% at the laser readback wavelength.

* * * * *